US007496625B1

(12) United States Patent
Belcher et al.

(10) Patent No.: US 7,496,625 B1
(45) Date of Patent: Feb. 24, 2009

(54) SYSTEM AND METHOD FOR COMMUNICATING MESSAGES BETWEEN A TEXT-BASED CLIENT AND A VOICE-BASED CLIENT

(75) Inventors: Aaron J. Belcher, Seattle, WA (US); Alan D. Gatzke, Bainbridge Island, WA (US); Joseph B. Burton, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 900 days.

(21) Appl. No.: 10/288,679

(22) Filed: Nov. 4, 2002

(51) Int. Cl.
   *G06F 15/16* (2006.01)
(52) U.S. Cl. .................. 709/204; 709/205; 709/206
(58) Field of Classification Search .......... 709/204, 709/206, 205
   See application file for complete search history.

(56) References Cited

U.S. PATENT DOCUMENTS

| | | | | |
|---|---|---|---|---|
| 6,301,609 B1 * | 10/2001 | Aravamudan et al. | ....... | 709/207 |
| 6,430,602 B1 | 8/2002 | Kay et al. | ................... | 709/206 |
| 6,434,599 B1 | 8/2002 | Porter | ........................ | 709/204 |
| 6,438,222 B1 | 8/2002 | Burg | ..................... | 379/215.01 |
| 6,442,242 B1 | 8/2002 | McAllister et al. | ......... | 379/67.1 |
| 6,463,142 B1 | 10/2002 | Kilp | ...................... | 379/201.06 |
| 6,466,909 B1 | 10/2002 | Didcock | ..................... | 704/260 |
| 2001/0037382 A1 * | 11/2001 | Anttila | ....................... | 709/223 |
| 2002/0023131 A1 * | 2/2002 | Wu et al. | ..................... | 709/205 |
| 2003/0002633 A1 * | 1/2003 | Kredo et al. | ............. | 379/88.08 |
| 2003/0039340 A1 * | 2/2003 | Deshpande et al. | ...... | 379/88.16 |
| 2003/0055908 A1 * | 3/2003 | Brown et al. | ................ | 709/207 |
| 2003/0097447 A1 * | 5/2003 | Johnston | ..................... | 709/227 |
| 2003/0112952 A1 * | 6/2003 | Brown et al. | ........... | 379/211.01 |
| 2003/0135569 A1 * | 7/2003 | Khakoo et al. | .............. | 709/206 |
| 2004/0047303 A1 * | 3/2004 | Fernandez et al. | .......... | 370/293 |
| 2004/0076272 A1 * | 4/2004 | Zafar et al. | .............. | 379/88.13 |
| 2004/0192261 A1 * | 9/2004 | Higuchi et al. | ........... | 455/412.1 |

* cited by examiner

*Primary Examiner*—Kenny S Lin
(74) *Attorney, Agent, or Firm*—Baker Botts L.L.P.

(57) ABSTRACT

A system for communicating messages comprises a session server and a messaging server. The session server receives a call from a first client. The call is intended for a second client. The messaging server is coupled to the session server and receives the call from the session server. The messaging server further communicates a first-text message to an instant messaging client associated with the second client in response to receiving the call. The messaging server further receives a second-text message communicated by the instant messaging client. The second-text message is responsive to the first-text message. The messaging server further converts the second-text message into a voice message and communicates the voice message to the first client.

40 Claims, 3 Drawing Sheets

SYSTEM AND METHOD FOR COMMUNICATING MESSAGES BETWEEN A TEXT-BASED CLIENT AND A VOICE-BASED CLIENT

TECHNICAL FIELD OF THE INVENTION

This invention relates to communication systems and more particularly to a system for communicating messages between a text-based client and a voice-based client.

BACKGROUND OF THE INVENTION

When a person who is talking to someone on a telephone receives a new call, the person traditionally has two options. First, the person may put the original call on hold and answer the new call. Second, the person may allow the caller to be forwarded to voicemail, listen to the voice message, and then call the party back. The first option ends up disrupting the original call. If the original call is important, the called party may not want to disrupt the call. The second option is often a better choice from the called person's perspective, but it can be more difficult on the caller. The caller has not been given any indication of when to expect a return call.

SUMMARY OF THE INVENTION

In accordance with the present invention, the disadvantages and problems associated with prior communications systems have been substantially reduced or eliminated.

In one embodiment, a system for communicating messages includes a session server and a messaging server. The session server receives a call from a first client. The call is intended for a second client. The messaging server is coupled to the session server and receives the call from the session server. The messaging server further communicates a first text message to an instant messaging client associated with the second client in response to receiving the call. The messaging server then receives a second text message communicated by the instant messaging client. The second text message is responsive to the first text message. The messaging server converts the second text message into a voice message and communicates the voice message to the first client.

Another embodiment of the present invention comprises a method for communicating messages. The method includes receiving a call from a first client. The call is intended for a second client. The method further comprises communicating a first text message to an instant messaging client associated with the second client in response to receiving the call. The method continues by receiving a second text message generated by the instant messaging client. The second text message is responsive to the first text message. The method concludes by converting the second text message into a voice message and communicating the voice message to the first client.

The following technical advantages may be achieved by some, none, or all of the embodiments of the present invention. A first client may place a call intended for a second client that is already conducting another call with yet another client. Rather than requiring the first client to leave a voicemail for the second client or requiring the second client to discontinue the original call or place the original call on hold while the second client connects with the first client, the invention provides the ability to communicate messages between the first client and the second client. Using text-to-speech and speech-to-text technology along with instant messaging services, the first client may receive a suitably formatted response from the second client without requiring an interruption to the original call being conducted by the second client. These and other advantages, features, and objects of the present invention will be more readily understood in view of the following detailed description and the drawings.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
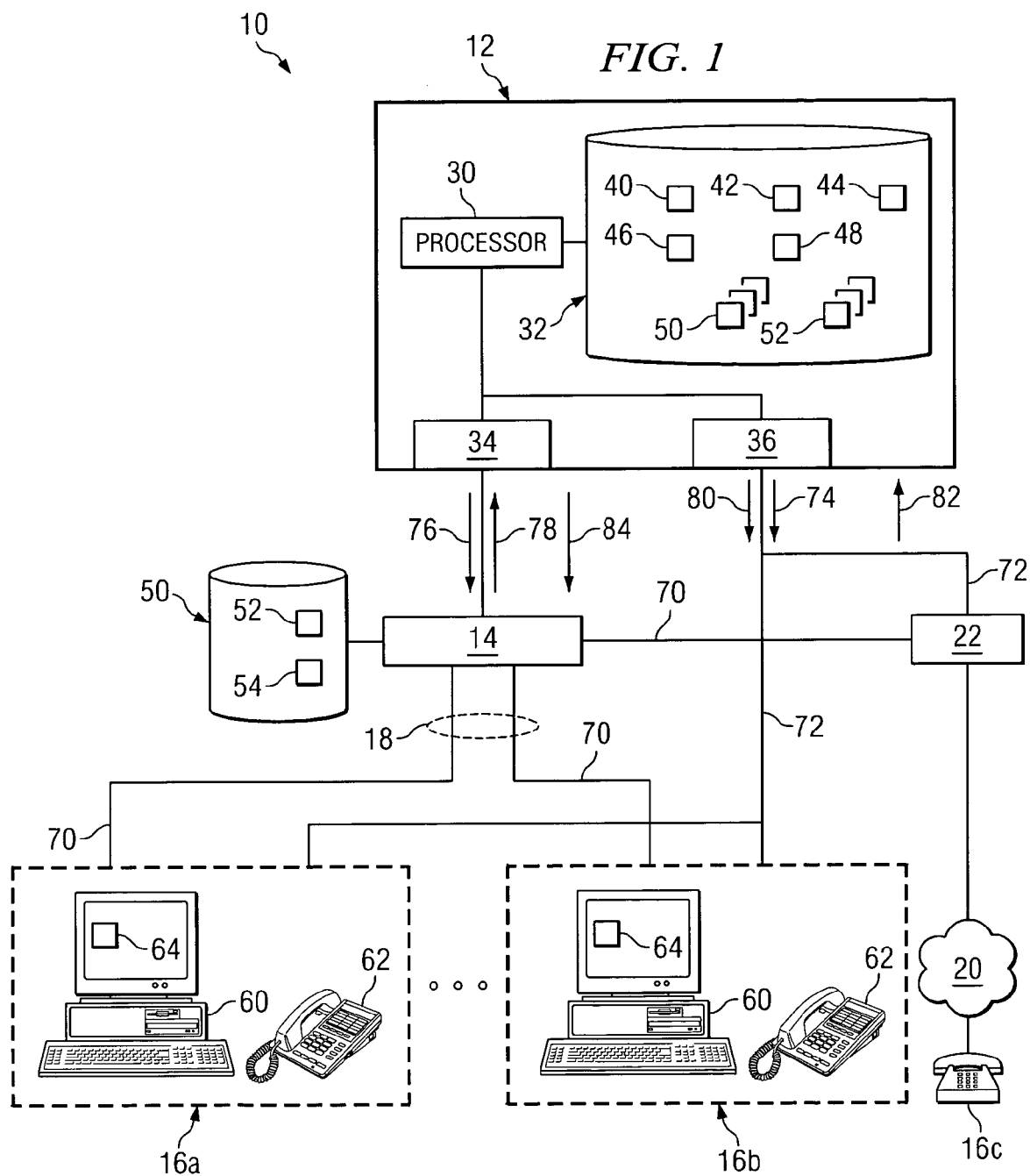
FIG. 1 illustrates one embodiment of a system for communicating messages between a text-based client and a voice-based client.

FIG. 1 illustrates one embodiment of a system 10 for communicating messages between a text-based client and a voice-based client. System 10 includes a messaging server 12 coupled to a session server 14 and clients 16. Particular clients 16, such as clients 16a and 16b, couple to session server 14 using data lines 18. Other clients 16, such as client 16c, couples to session server 14 using the public switched telephone network (PSTN) 20 and a gateway 22. In general, a call 70 is placed by a first client 16 and intended for a second client 16. If call 70 is unable to be completed to the second client 16, such as, for example, because the second client 16 is connected to another call, then messaging server 12 communicates a first text message to an instant messaging client associated with the second client 16. The first text message may indicate that the first client 16 is attempting to connect with the second client 16. In response, the instant messaging client associated with the second client 16 communicates a second text message that is responsive to the first text message. Messaging server 12 converts the second text message into a voice message for communication to the first client 16. In this respect, the second client 16 is able to communicate with the first client 16, for example, without disrupting another call being conducted by the second client 16. Furthermore, the first client 16 receives a prompt response from second client 16.

Messaging server 12 comprises a processor 30 coupled to a memory 32, a first interface 34 and a second interface 36. In general, processor 30 comprises a central processing unit while memory 32 comprises one or more components of random access memory (RAM), read only memory (ROM), magnetic computer disk, CD-ROM, other magnetic or optical storage media, or any other volatile or non-volatile storage device that stores a text-to-speech conversion application 40, a speech-to-text conversion application 42, an instant messaging application 44, client directory 46, configuration data 48, voice files 50, text files 52, and any other suitable files, applications, instructions, tables, or other information used to perform the operation of system 10. Although FIG. 1 illustrates memory 32 as internal to server 12, it should be understood that memory 32, or particular items stored therein, may be internal or external to various components of system 10, depending on the particular implementation. Also, memory 32 illustrated in FIG. 1 may be separate or integral to other memory of system 10. Processor 30 and memory 32 execute instructions and manipulate information in accordance with the operation of system 10.

Interface 34 comprises an Internet Protocol (IP) interface operable to communicate with session server 14. In one embodiment, interface 34 supports Session Initiation Protocol (SIP) and SIP for Instant Messaging and Presence Leveraging Extensions (SIMPLE). SIMPLE is an extension to the SIP protocol used by instant messaging clients associated with clients 16. Second interface 36 comprises an audio driver operable to communicate with gateway 22 and/or clients 16. In one embodiment, messaging server 12 comprises a unified messaging system that can handle voice, fax, and regular text messages as objects in a single mailbox that a user can access either with a regular e-mail client or by telephone. In general, messaging server 12 supports the following network, transport, and control protocols: SIP, SIMPLE, Internet Protocol (IP), User Datagram Protocol (UDP), Transport Control Protocol (TCP), Domain Name System (DNS), and Session Description Protocol (SDP).

Session server 14 comprises any suitable server operable to establish a connection between an originating endpoint of system 10 and a target endpoint of system 10, such as, for example, connecting a call 70 between clients 16 or between a particular client 16 and messaging server 12. In a particular embodiment, session server 14 comprises a Voice Over Internet Protocol (VoIP) server that performs the functions of signaling and session management within a packet telephony network. The signaling functionality of session server 14 allows call information to be carried across network boundaries. The session management functionality of session server 14 provides the ability to control the attributes of an end-to-end call 70. In a particular embodiment, the VoIP protocol supported by session server 14 comprises SIP, which is a standard for multimedia conferencing over internet protocol. In this embodiment, session server 14 comprises a SIP proxy server that handles all call processing, SIP requests, and SIP responses. Although the following description of session server 14 is detailed with respect to SIP, it should be understood that server 14 supports other IP telephony protocols as well, such as the H.323 protocol.

SIP comprises an application layer control protocol that can be used to establish, maintain, and terminate calls 70 between two or more endpoints. Therefore, server 14 can determine the location of a target endpoint and support address resolution, name mapping, and call routing and redirection. Server 14 can further determine the immediate capabilities of the target endpoint and determine the highest level of common services between the endpoints. In this regard, conferences are established between endpoints using the media capabilities that can be supported by all endpoints. Server 14 can further determine the availability of the target endpoint. Therefore, if a call 70 cannot be completed because the target endpoint is unavailable, server 14 determines whether the called party is already on the phone or did not answer in the allotted number of rings. Server 14 then generates a message indicating why the target endpoint is unavailable. Server 14 further establishes a session between the originating endpoint and the target endpoint. Therefore, if the call 70 can be completed, server 14 establishes a session between the endpoints. Server 14 also supports mid-call changes, such as the addition of another endpoint to the conference or the changing of a media characteristic or CODEC. Server 14 further handles the transfer and termination of calls 70. For example, server 14 supports the transfer of calls 70 from one endpoint to another. During a call transfer, server 14 establishes a session between the transferee and a new endpoint (specified by the transferring party) and terminates the session between the transferee and the transferring party. At the end of a call 70, server 14 terminates the sessions between all parties. Session server 14 is associated with memory 50 that stores addressing information 52 associated with endpoints within system 10, and a session table 54 that logs the various sessions hosted by session server 14.

Clients 16 comprise any suitable devices that may place or receive a call 70. For example, client 16c may comprise a traditional telephone that connects to the components of system 10 using PSTN 20. In another example, clients 16 may comprise any suitable combination of a workstation 60 and an IP phone 62. Workstation 60 may comprise any suitable processor and memory operable to communicate with session server 14 using data lines 18 and to operate an instant messaging client 64. IP phone 62 comprises any suitable IP-based telephone that may communicate with components on a local or wide area IP network. In a particular embodiment, IP phone 62 comprises softphone, such as a software based application operated by workstation 60. Such a softphone also has communication capabilities with an IP network. In general, IP phones 62 can both initiate SIP requests and respond to SIP requests. Instant messaging client 64 comprises a software application that operates upon workstation 60 and provides instant messaging services to the users of workstation 60. Instant messaging client 64 communicates messages between workstation 60 and processor 30 of messaging server 12. In addition to text messages, instant messaging client 64 may also communicate audio data, video data, web data, streaming content, files, or any other suitable data between workstation 60 and messaging server 12. Various online services, such as America Online, Prodigy, CompuServ, and MSN may provide a suitable instant messaging client 64 for use in system 10.

Data lines 18 comprise any suitable communication links that support packet-based communications. In a particular embodiment, data lines 18 support the SIP protocol. PSTN 20 comprises the public switched telephone network. Gateway 22 comprises a VoIP communication device that performs a translation function between VoIP conferencing endpoints and other terminals. This function includes translation between transmission formats and between communications procedures. In addition, gateway 22 also translates between audio and video CODECs and performs call setup and clearing on both the packet-switched network side and the circuit-switched network side. For example, gateway 22 interfaces session server 14 with PSTN 20. Therefore, when a call 70 is placed by client 16c using PSTN 20, gateway 22 translates the call format associated with PSTN 20 to a call format associated with session server 14, such as, for example, SIP or any other suitable VoIP protocol.

In operation, session server 14 receives a call 70 from a first client 16 that is intended for a second client 16. For example, call 70 may be placed by client 16c using PSTN 20 and received by session server 14 using gateway 22. This call 70 may be intended for either of clients 16a or 16b. In another embodiment, session server 14 may receive a call 70 from client 16a that is intended for client 16b within system 10. If the call 70 is received through PSTN 20, gateway 22 translates the call 70 between transmission formats and/or between communication procedures from those associated with PSTN 20 to those associated with session server 14. Upon receiving a call 70, session server 14 determines whether the second client 16, the intended recipient of the call 70, is able to receive the call 70. If session server 14 determines that the target endpoint, the second client 16, is available, then session server 14 establishes a session between the originating endpoint and the target endpoint. In this regard, call 70 is completed between the first client 16 and the second client 16.

If call 70 cannot be completed because the target endpoint, second client 16, is unavailable or is busy with another call, session server 14 forwards call 70 to messaging server 12. In addition, session server 14 may communicate call data associated with call 70. The call data may identify at least the first client 16 and the second client 16 using a telephone extension, an IP address, a SIP alias, or any other suitable identifier. Messaging server 12 receives call 70 and the identities of first client 16 and second client 16 in the call data. Messaging server 12 establishes a voice connection 72 with the appropriate first client 16 using interface 36. Messaging server 12 then communicates a voice message 74 to the first client 16 using voice connection 72. Voice message 74 notifies first client 16, for example, that second client 16 is unable to take call 70 and requests that first client 16 holds on the line.

Processor 30 operates instant messaging application 44 to generate and communicate a text message 76 to instant messaging client 64 associated with second client 16. Text message 76 notifies second client 16 that first client 16 is holding on the line, and prompts second client 16 to reply with a message for first client 16. Instant messaging client 64 associated with second client 16 communicates a reply text message 78 for communication to messaging server 12. The reply text message 78 is responsive to text message 76 and comprises a suitable message from second client 16 to first client 16. Messaging server 12 receives text message 78 and stores text message 78 in a text file 50. Processor 30 operates text-to-speech application 40 to convert text message 78 into a voice message 80 to be communicated to first client 16. The voice message 80 is stored in a voice file 52, and communicated to second client 16 by second interface 36 using voice connection 72. In this regard, second client 16 is able to communicate with first client 16 in a suitable format, without the need to disrupt a prior call conducted by second client 16.

First client 16 is then provided the opportunity to leave a voice message 82 for second client 16. Interface 36 captures voice message 82 provided by first client 16. First client 16 may then terminate the call 70. Processor 30 may provide voice message 82 to second client 16 in a number of ways. For example, voice message 82 may be provided to a voice mailbox associated with second client 16. Voice message 82 may be provided as an audio file attachment sent to an electronic mailbox associated with second client 16. Processor 30 may operate speech-to-text application 42 to convert voice message 82 into a text message 84 for communication to an electronic mailbox associated with second client 16. Processor 30 may operate speech-to-text application 42 to convert voice message 82 to a text-based instant message 84 for communication to instant messaging client 64 associated with second client 16.

A particular advantage of system 10 is that a particular second client 16 may be conducting a call with another client either within or outside of system 10 when a call 70 intended for second client 16 is received by session server 14. Rather than requiring the first client 16 to leave a voicemail for second client 16 or requiring second client 16 to terminate the original call or place the original call on hold while second client 16 connects with first client 16, system 10 provides the ability to communicate messages between first client 16 and second client 16. Using text-to-speech and speech-to-text technology along with instant messaging services, the first client 16 may receive a suitably formatted response from second client 16 without requiring an interruption to the original call being conducted by second client 16.

Figure 2:
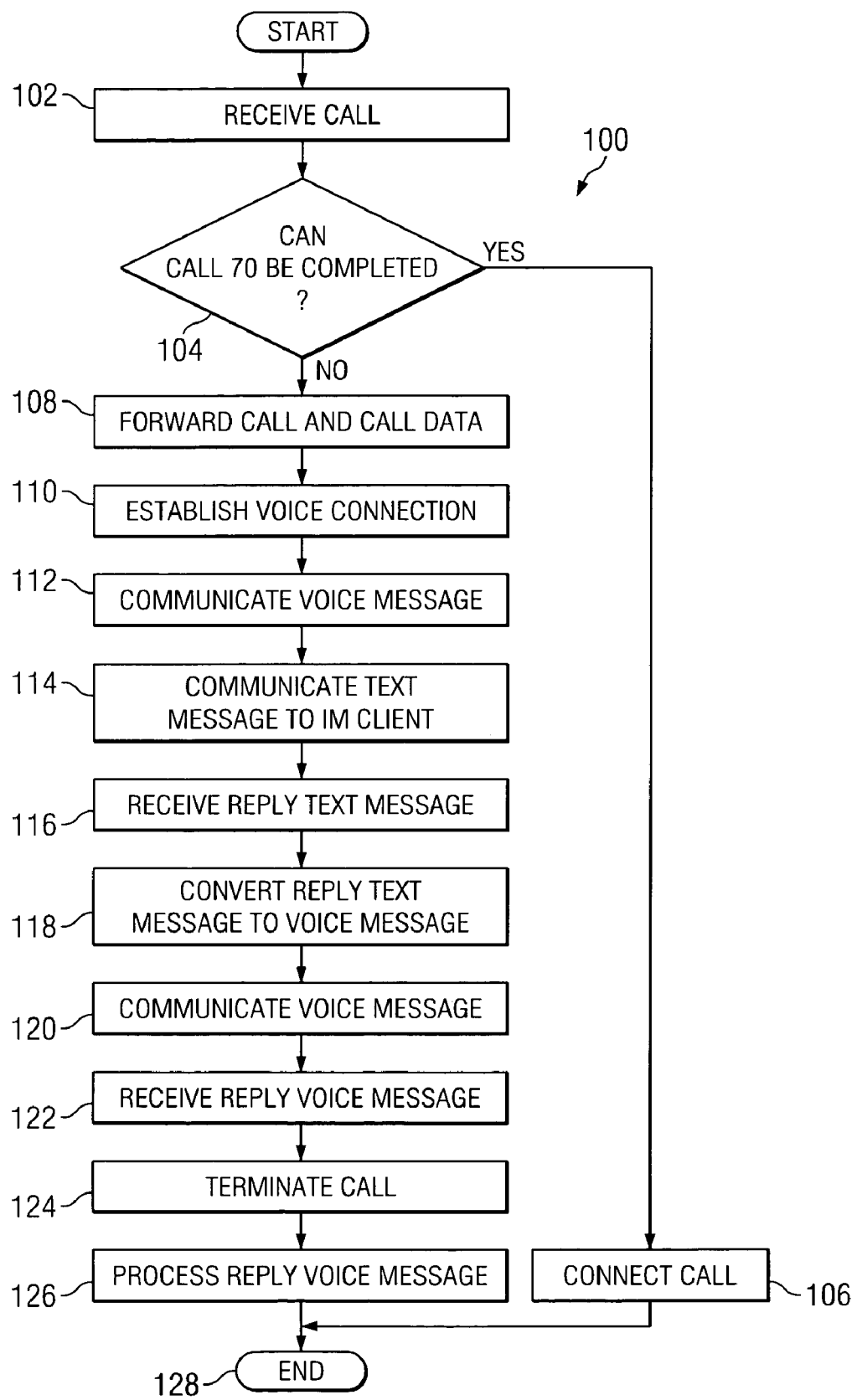
FIG. 2 illustrates a flowchart that describes the communication of messages between clients associated with the system of FIG. 1.

FIG. 2 illustrates a flowchart 100 that describes the communication of messages between clients 16 of system 10. The method begins at step 102 where session server 14 receives a call 70 placed by a first client 16 and intended for a second client 16. At step 104, session server 14 determines whether call 70 can be completed with second client 16. If so, execution proceeds to step 106 where session server 14 connects call 70 between first client 16 and second client 16. Execution then terminates step 128. If call 70 cannot be completed with second client 16, as determined at step 104, execution proceeds to step 108 where session server 14 forwards call 70 and call data associated with call 70 to messaging server 12.

Interface 36 of messaging server 12 establishes a voice connection 72 with first client 16, at step 110. Messaging server 12 communicates voice message 74 to first client 16 using voice connection 72 at step 112. At this point, first client 16 holds on the line and awaits a response from second client 16. The remaining steps of flowchart 100 allow second client 16 to respond to first client 16 promptly and without the need to disrupt any other calls with which second client 16 may be participating.

Execution proceeds to step 114 where messaging server 12 communicates a text message 76 to instant messaging client 64 associated with second client 16. Instant messaging client 64 associated with second client 16 may generate a reply text message 78 that is responsive to text message 76. Messaging server 12 receives reply text message 78 at step 116. Reply text message 78 represents a message from second client 16 to first client 16. However, because message 78 is text based, first client 16 may be unable to receive the message. Therefore, messaging server 12 converts reply text message 78 to voice message 80 at step 118. In particular, processor 30 may operate text-to-speech application 40 to perform the conversion of reply text message 78 to voice message 80. Interface 36 of messaging server 12 communicates voice message 80 to first client 16 at step 120. In this regard, first client 16 promptly receives a response from second client 16.

First client 16 is prompted to generate a voice message 82 that is responsive to voice message 80. If first client 16 generates such a reply voice message 82, messaging server 12 receives voice message 82 at step 122. At this point, call 70 may be terminated by session server 14 at step 124. Messaging server 12 may process reply voice message 82 at step 126 in a number of ways. For example, messaging server 12 may communicate voice message 82 to a voice mailbox associated with second client 16. In another embodiment, messaging server 12 communicates an audio file attachment containing voice message 82 to an electronic mailbox associated with second client 16. In yet another embodiment, processor 30 operates speech-to-text application 42 to convert voice message 82 to a text message 84 to be communicated to an electronic mailbox associated with second client 16 or to an instant messaging client 64 associated with second client 16. The method terminates at step 128.

Figure 3:
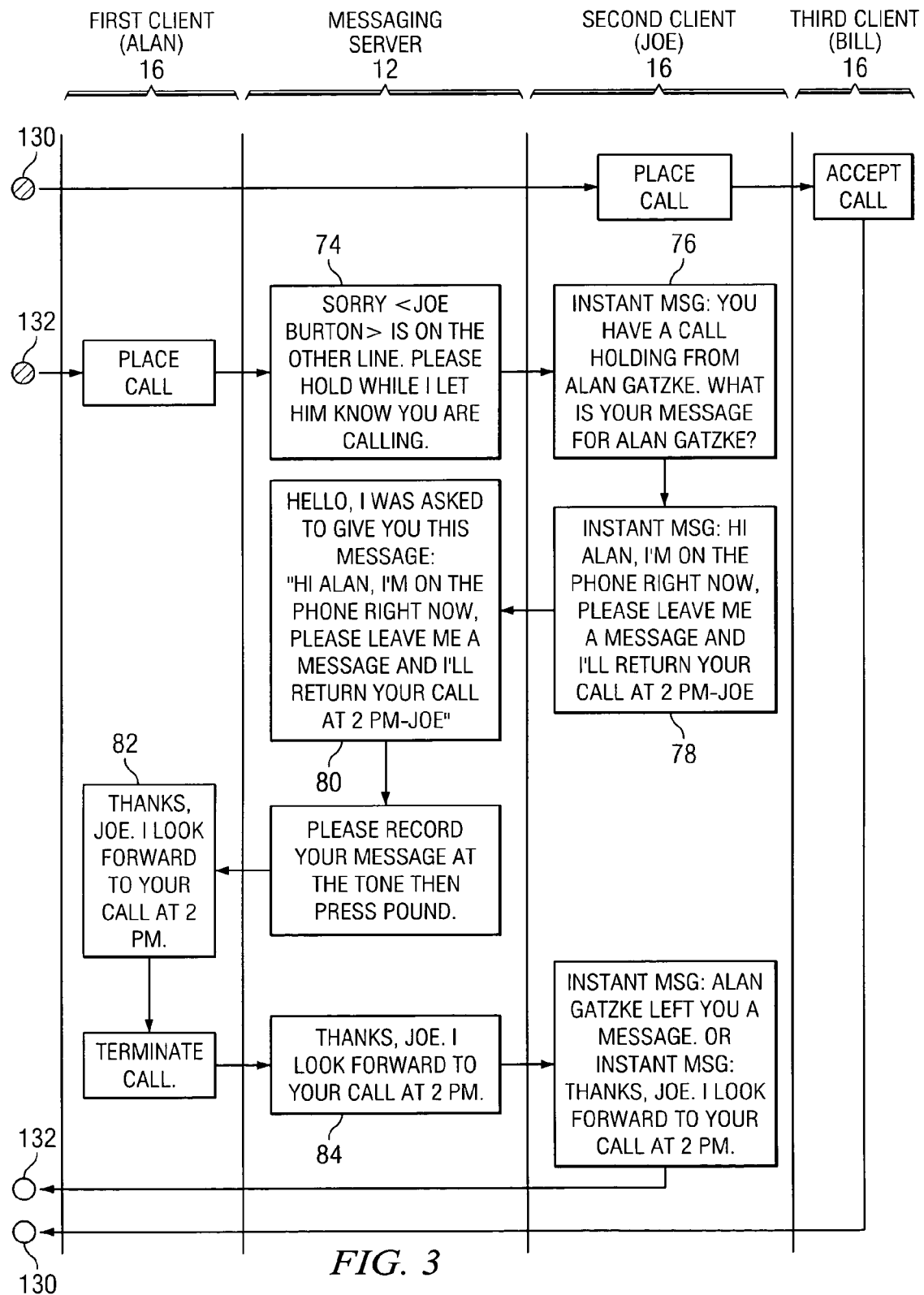
FIG. 3 illustrates exemplary messages communicated among the components of a system of FIG. 1.

FIG. 3 illustrates exemplary messages communicated among the components of system 10. Path 130 represents a call that takes place between a second client 16 and a third client 16. In this regard, when first client 16 places a call 70 intended for second client 16, second client 16 is already conducting another call that is not to be terminated or disrupted. First client 16 places a call 70 intended for second client 16, as represented by path 132. Because second client 16 is already conducting a call with third client 16, as described above with reference to path 130, the call 70 placed by first client 16 is forwarded to the messaging server 12.

Messaging server 12 communicates voice message 74 to first client 16. Messaging server 12 communicates text message 76 to instant messaging client 64 associated with second client 16. Second client 16 communicates reply text message 78 to managing server 12. Messaging server 12 converts text message 78 into voice message 80 and communicates voice message 80 to first client 16. Messaging server 12 prompts first client 16 to record a voice message 82. First client 16 records voice message 82 and terminates call 70. Messaging server 12 processes voice message 82 as described above. In one embodiment, messaging server 12 communicates a text message 84 to instant messaging client 64 associated with second client 16. Text message 84 may inform second client 16 that first client 16 left a voice message 82, or it may actually provide the content of voice message 82 in text format. It is understood that the content and/or ordering of one or more messages 74-84 may be modified without departing from the scope of the present invention.

Although the present invention has been described in detail, it should be understood that various changes, substitutions and alterations can be made hereto without departing from the scope of the invention as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless "means for" or "step for" are used in the particular claim.

What is claimed is:

1. A system for communicating messages, comprising:
   a session server operable to:
      receive a first call from a first client, the first call intended for a second client;
      determine that the second client is connected to a second call; and
      in response to determining that the second client is connected to the second call,
      forward the first call to a messaging server; and
   the messaging server coupled to the session server and operable to:
      receive the first call from the session server; and
      while the second client is connected to the second call:
         communicate, during the first call, a first text message to an instant messaging client associated with the second client in response to receiving the first call;
         receive a second text message communicated by the instant messaging client, the second text message responsive to the first text message;
         convert the second text message into a voice message; and
         communicate the voice message to the first client during the first call, thereby allowing a user of the second client to communicate information to the first client while the second client is connected to the second call.

2. The system of claim 1, wherein the session server forwards call data associated with the first call to the messaging server, the call data identifying at least the first client and the second client.

3. The system of claim 2, wherein the messaging server generates the first text message using at least the call data.

4. The system of claim 1, wherein the instant messaging client operates on a workstation associated with the second client, the workstation having an internet protocol (IP) address.

5. The system of claim 4, wherein:
   the session server establishes a data connection between the messaging server and the workstation using the IP address of the workstation; and
   the first text message is communicated to the instant messaging client using the data connection.

6. The system of claim 5, wherein the second text message is communicated to the messaging client using the data connection.

7. The system of claim 1, wherein at least one of the first client and the second client comprises an IP phone coupled to the session server.

8. The system of claim 1, wherein the first text message identifies the first client and indicates that the first client is attempting to connect with second client.

9. The system of claim 1, wherein the session server comprises a voice-over-internet-protocol (VoIP) proxy server and the first client places the first call using the public-switched-telephone (PSTN) network, and further comprising a VoIP gateway that interfaces the VoIP proxy server with the PSTN.

10. The system of claim 9, wherein the messaging server establishes a voice connection with the VoIP gateway and the voice message is communicated to the first client using the voice connection.

11. The system of claim 1, wherein the voice message comprises a first voice message and the messaging server further receives a second voice message communicated by the first client.

12. The system of claim 11, wherein the messaging server converts the second voice message to a third text message.

13. The system of claim 12, wherein the messaging server communicates the third text message to at least one of the instant messaging client associated with the second client and an electronic mailbox associated with the second client.

14. The system of claim 1, wherein:
   the session server comprises a voice-over-internet-protocol (VoIP) proxy server;
   the first client places the first call using the public-switched-telephone (PSTN) network; and
   the first call is associated with a first call format and further comprising a VoIP gateway that interfaces the VoIP proxy server with the PSTN and associates the call to a second call format, the second call format comprising a VoIP protocol.

15. The system of claim 14, wherein the VoIP protocol comprises Session Initiation Protocol (SIP) and the session server comprises a SIP proxy server.

16. A method for communicating messages, comprising:
   receiving a first call from a first client, the first call intended for a second client;
   determining that the second client is connected to a second call;
   in response to determining that the second client is connected to the second call, forwarding the first call to a messaging server for communicating a first text message to an instant messaging client associated with the second client during the first call; and
   while the second client is connected to the second call,
      receiving, at the messaging server a second text message generated by the instant messaging client, the second text message responsive to the first text message;
      converting the second text message into a voice message; and
      communicating the voice message from the messaging server to the first client during the first call.

17. The method of claim 16, wherein the instant messaging client operates on a workstation associated with the second client, the workstation having an internet protocol (IP) address.

18. The method of claim 17, further comprising establishing a data connection with the workstation using the IP address of the workstation, wherein the first text message is communicated to the instant messaging client using the data connection.

19. The method of claim 18, wherein the second text message is communicated to the messaging client using the data connection.

20. The method of claim 16, wherein at least one of the first client and the second client comprises an internet protocol (IP) phone.

21. The method of claim 16, wherein the first text message identifies the first client and indicates that the first client is attempting to connect with the second client.

22. The method of claim 16, further comprising establishing a voice connection with the first client, wherein the voice message is communicated using the voice connection.

23. The method of claim 16, wherein the voice message comprises a first voice message and further comprising receiving a second voice message communicated by the first client.

24. The method of claim 23, further comprising converting the second voice message to a third text message.

25. The method of claim 24, further comprising communicating the third text message to at least one of the instant messaging client associated with the second client and an electronic mailbox associated with the second client.

26. The method of claim 16, wherein the first call is associated with a first call format and further comprising associating the first call with a second call format, the second call format comprising a voice-over-internet-protocol (VoIP) protocol.

27. The method of claim 26, wherein the VoIP protocol comprises Session Initiation Protocol (SIP).

28. A system for communicating messages, comprising:
   means for receiving a first call from a first client, the first call intended for a second client;
   means for determining that the second client is connected to a second call;
   means for forwarding the first call to a messaging means in response to determining that the second client is connected to the second call;
   the messaging means comprising:
      means for receiving the forwarded first call;
      means for communicating, during the first call, a first text message to an instant messaging client associated with the second client while the second client is connected to the second call;
      means for receiving a second text message generated by the instant messaging client while the second client is connected to the second call, the second text message responsive to the first text message;
      means for converting the second text message into a voice message; and
      means for communicating the voice message to the first client during the first call, thereby allowing a user of the second client to communicate information to the first client while the second client is connected to the second call.

29. The system of claim 28, wherein the instant messaging client operates on a workstation associated with the second client, the workstation having an internet protocol (IP) address.

30. The system of claim 29, further comprising means for establishing a data connection with the workstation using the IP address of the workstation, wherein the first text message is communicated to the instant messaging client using the data connection.

31. The system of claim 30, wherein the second text message is communicated to the messaging client using the data connection.

32. The system of claim 28, wherein at least one of the first client and the second client comprises an internet protocol (IP) phone.

33. The system of claim 28, wherein the first text message identifies the first client and indicates that the first client is attempting to connect with the second client.

34. The system of claim 28, further comprising means for establishing a voice connection with the first client, wherein the voice message is communicated using the voice connection.

35. The system of claim 28, wherein the voice message comprises a first voice message and further comprising means for receiving a second voice message communicated by the first client.

36. The system of claim 35, further comprising means for converting the second voice message to a third text message.

37. The system of claim 36, further comprising means for communicating the third text message to at least one of the instant messaging client associated with the second client and an electronic mailbox associated with the second client.

38. The system of claim 28, wherein the first call is associated with a first call format and further comprising means for associating the first call with a second call format, the second call format comprising a voice-over-internet-protocol (VoIP) protocol.

39. The system of claim 38, wherein the VoIP protocol comprises Session Initiation Protocol (SIP).

40. A system for communicating messages, comprising:
   a session server operable to:
      receive a first call from a first client, the first call intended for a second client;
      determine that the second client is connected to a second call; and
      in response to determining that the second client is connected to the second call,
      forward the first call to a messaging server; and
   the messaging server coupled to the session server and operable to:
      receive the first call from the session server;
      while the second client is connected to the second call:
         communicate, during the first call, a first text message to an instant messaging client associated with the second client in response to receiving the call;
         receive a second text message communicated by the instant messaging client, the second text message responsive to the first text message;
         convert the second text message into a voice message; and
         communicate the voice message to the first client during the first call,
      thereby allowing a user of the second client to communicate information to the first client while the second client is connected to the second call;
   wherein the session server comprises a Session Initiation Protocol (SIP) proxy server, the first client places the call using the public-switched-telephone (PSTN) network, and further comprising a gateway that interfaces the SIP proxy server with the PSTN.

* * * * *